(12) United States Patent
Candiracci

(10) Patent No.: US 9,896,841 B2
(45) Date of Patent: Feb. 20, 2018

(54) PREFABRICATED BUILDING PRODUCT STRUCTURE MADE OF SINTERED EXPANDED POLYSTYRENE AND METHOD FOR THE RELATIVE PRODUCTION

(71) Applicant: Angelo Candiracci, Fano (IT)

(72) Inventor: Angelo Candiracci, Fano (IT)

( * ) Notice: Subject to any disclaimer, the term of this patent is extended or adjusted under 35 U.S.C. 154(b) by 0 days.

(21) Appl. No.: 15/126,578

(22) PCT Filed: Mar. 11, 2015

(86) PCT No.: PCT/EP2015/055027
§ 371 (c)(1),
(2) Date: Sep. 15, 2016

(87) PCT Pub. No.: WO2015/140018
PCT Pub. Date: Sep. 24, 2015

(65) Prior Publication Data
US 2017/0081850 A1 Mar. 23, 2017

(30) Foreign Application Priority Data
Mar. 18, 2014 (IT) .............................. PS2014A0004

(51) Int. Cl.
*E04C 2/22* (2006.01)
*B29C 44/12* (2006.01)
(Continued)

(52) U.S. Cl.
CPC ............ *E04C 2/22* (2013.01); *B29C 44/1266* (2013.01); *B29C 44/445* (2013.01); *E04B 1/80* (2013.01);
(Continued)

(58) Field of Classification Search
CPC .......... E04C 2/044; E04C 2/288; E04C 2/049; E04C 2/06; E04C 2/205; E04B 2/847; B21F 27/128
See application file for complete search history.

(56) References Cited

U.S. PATENT DOCUMENTS 3,879,908 A * 4/1975 Weismann ............ B21F 27/128
52/309.12
4,104,842 A * 8/1978 Rockstead ............ E04B 2/8617
52/309.12
(Continued)

FOREIGN PATENT DOCUMENTS

WO 2009017595 2/2009

*Primary Examiner* — Brian E Glessner
*Assistant Examiner* — Daniel J Kenny
(74) *Attorney, Agent, or Firm* — Themis Law

(57) ABSTRACT

A prefabricated building product structure made of sintered expanded polystyrene includes a composite assembly formed by aggregating steel to the sintered expanded polymeric mass, preferably of high density, and by embedding therein rod-like steel elements, preferably pre-assembled and forming a cage of electrowelded elements. A method of related production includes positioning the rod-like steel elements, preferably pre-assembled forming a cage of electrowelded elements, in the mold for the expansion of the polystyrene, pouring in the mold incoherent granules or pearls obtained from the polymerization of the styrene, with grain size and volume appropriate for the attainment of a high density finished product, expanding and sintering or amassing the incoherent polystyrene through contact with water vapor at a temperature higher than ninety degrees centigrade, and trapping the armor in the monolithic mass thus obtained to attain a solid geometry, according to the mold, of armored sintered expanded polystyrene.

8 Claims, 9 Drawing Sheets

Figure 5:
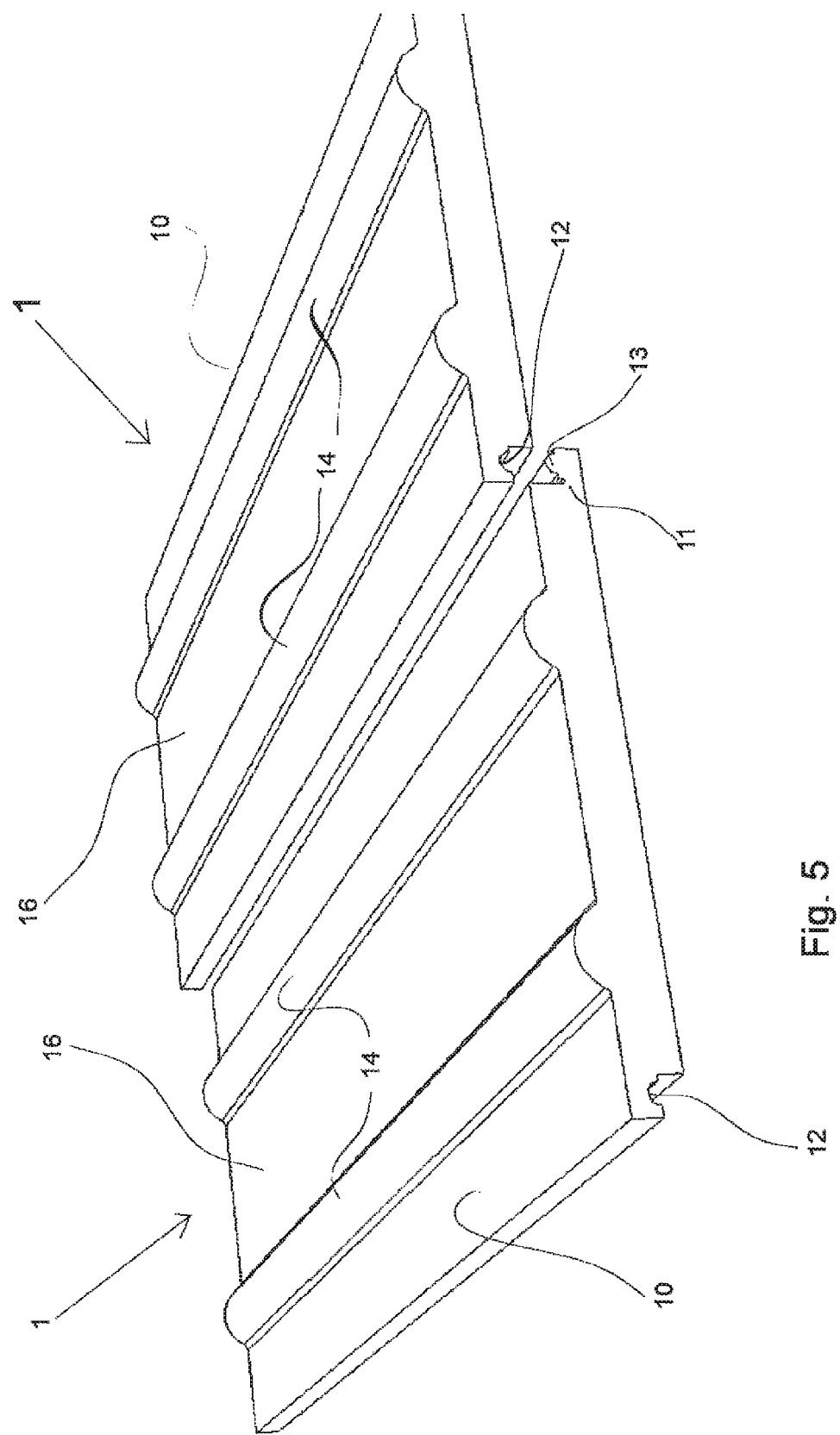

(51) Int. Cl.
| | |
|---|---|
| *B29C 44/44* | (2006.01) |
| *E04B 1/80* | (2006.01) |
| *E04B 1/90* | (2006.01) |
| *E04B 1/94* | (2006.01) |
| *E04B 1/98* | (2006.01) |
| *E04C 2/20* | (2006.01) |
| *E04C 2/28* | (2006.01) |
| *E04C 2/38* | (2006.01) |
| *B29K 25/00* | (2006.01) |
| *B29L 31/00* | (2006.01) |
| *B29K 105/04* | (2006.01) |
| *B29K 305/12* | (2006.01) |
| *E04C 2/00* | (2006.01) |

(52) U.S. Cl.
CPC ............... *E04B 1/90* (2013.01); *E04B 1/942* (2013.01); *E04B 1/98* (2013.01); *E04C 2/205* (2013.01); *E04C 2/28* (2013.01); *E04C 2/38* (2013.01); *B29K 2025/06* (2013.01); *B29K 2105/048* (2013.01); *B29K 2305/12* (2013.01); *B29L 2031/776* (2013.01); *E04C 2002/001* (2013.01); *E04C 2002/005* (2013.01)

(56) References Cited

U.S. PATENT DOCUMENTS

| | | | | |
|---|---|---|---|---|
| 4,181,556 | A * | 1/1980 | Fehlmann | E04C 2/22 156/196 |
| 5,842,276 | A * | 12/1998 | Asher | B26D 1/553 264/142 |
| 6,272,805 | B1 * | 8/2001 | Ritter | E04C 2/044 52/309.11 |
| 6,276,104 | B1 * | 8/2001 | Long, Sr. | B29C 44/569 428/318.4 |
| 7,954,291 | B2 * | 6/2011 | Cretti | E04B 5/19 52/309.12 |
| 8,343,398 | B2 * | 1/2013 | Khatchikian | E04C 2/044 264/261 |
| 8,453,413 | B2 * | 6/2013 | Matiere | E04B 5/40 249/173 |
| 2006/0251851 | A1 | 11/2006 | Bowman | |
| 2016/0194885 | A1 * | 7/2016 | Whispell | E04F 15/02 52/309.4 |

* cited by examiner

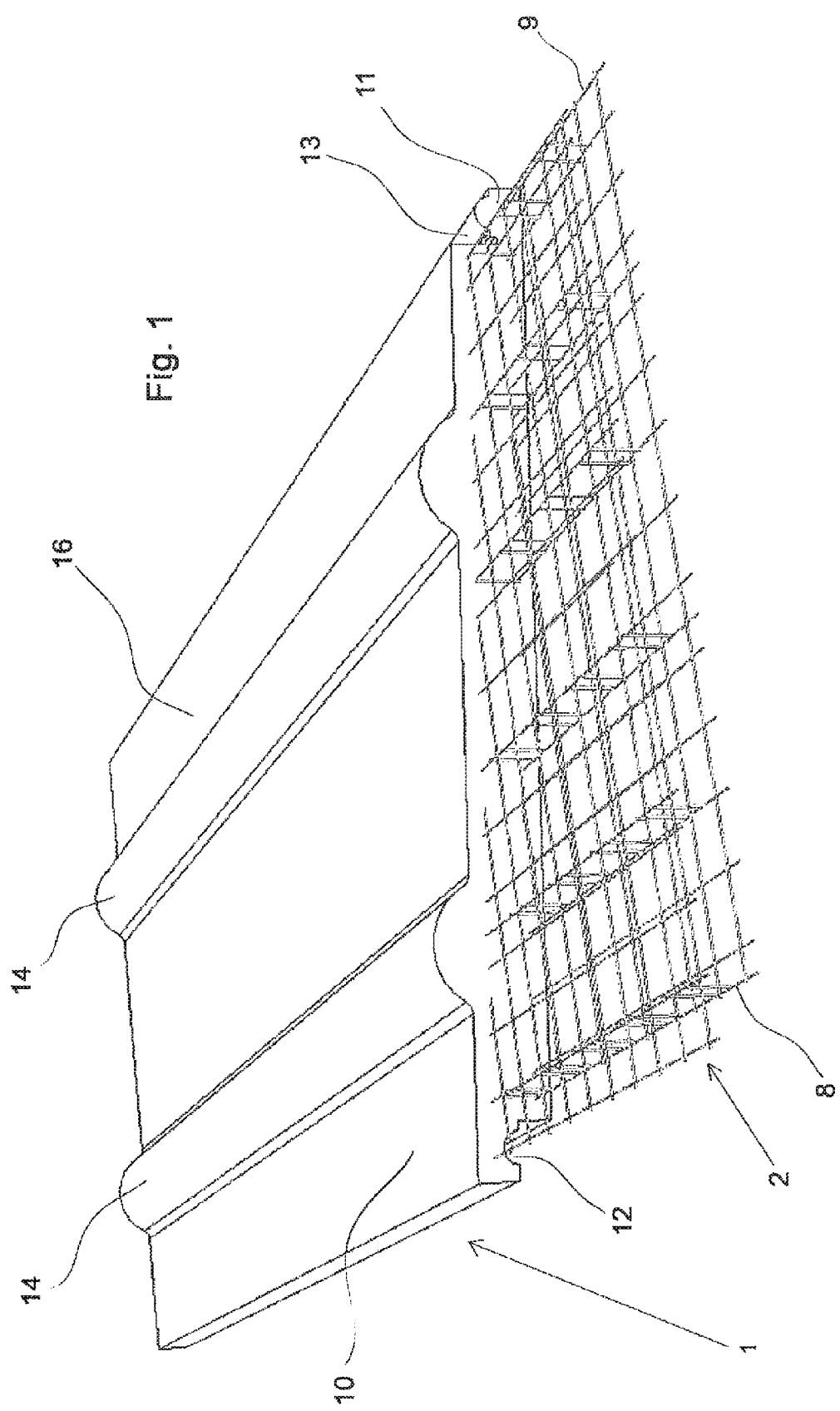

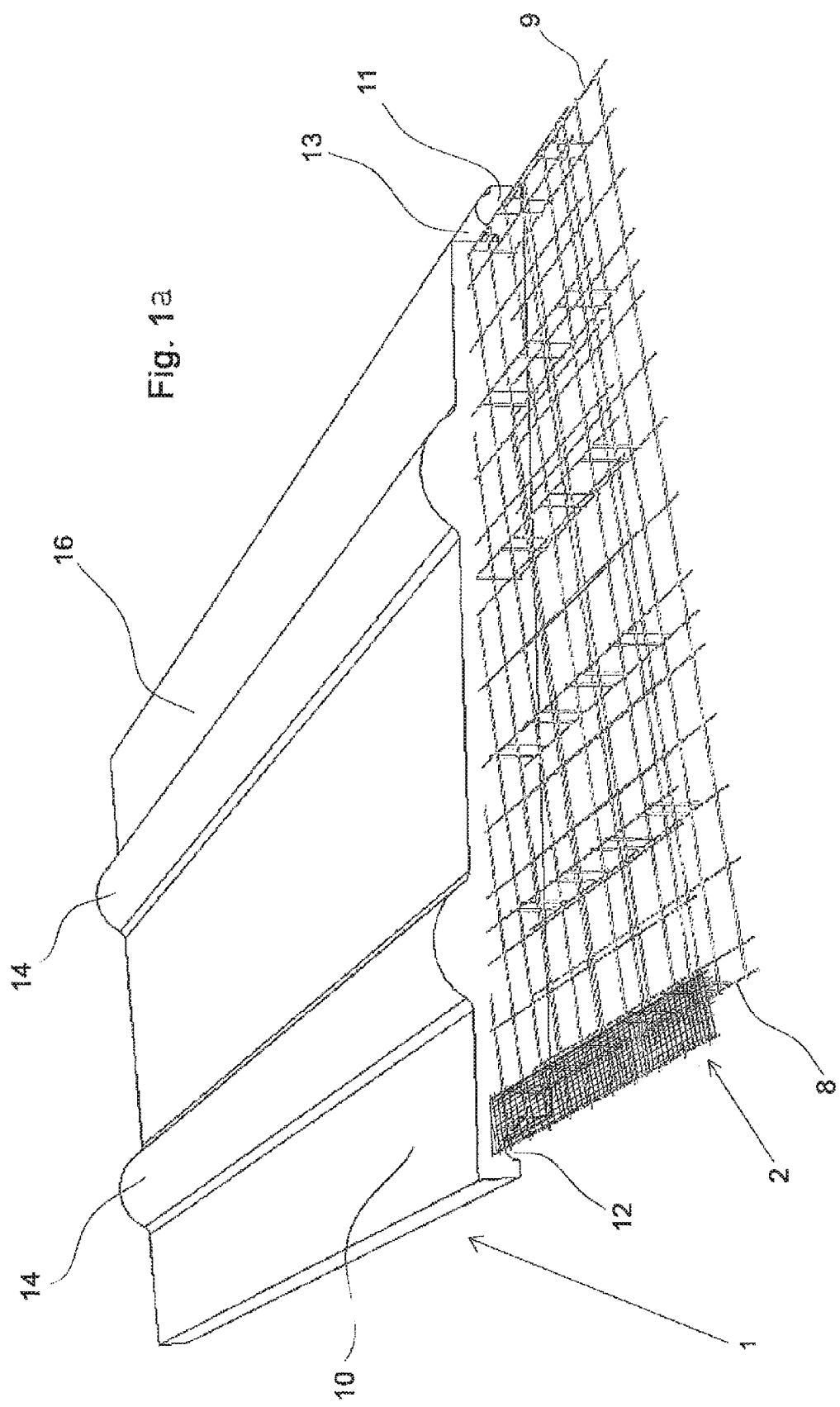

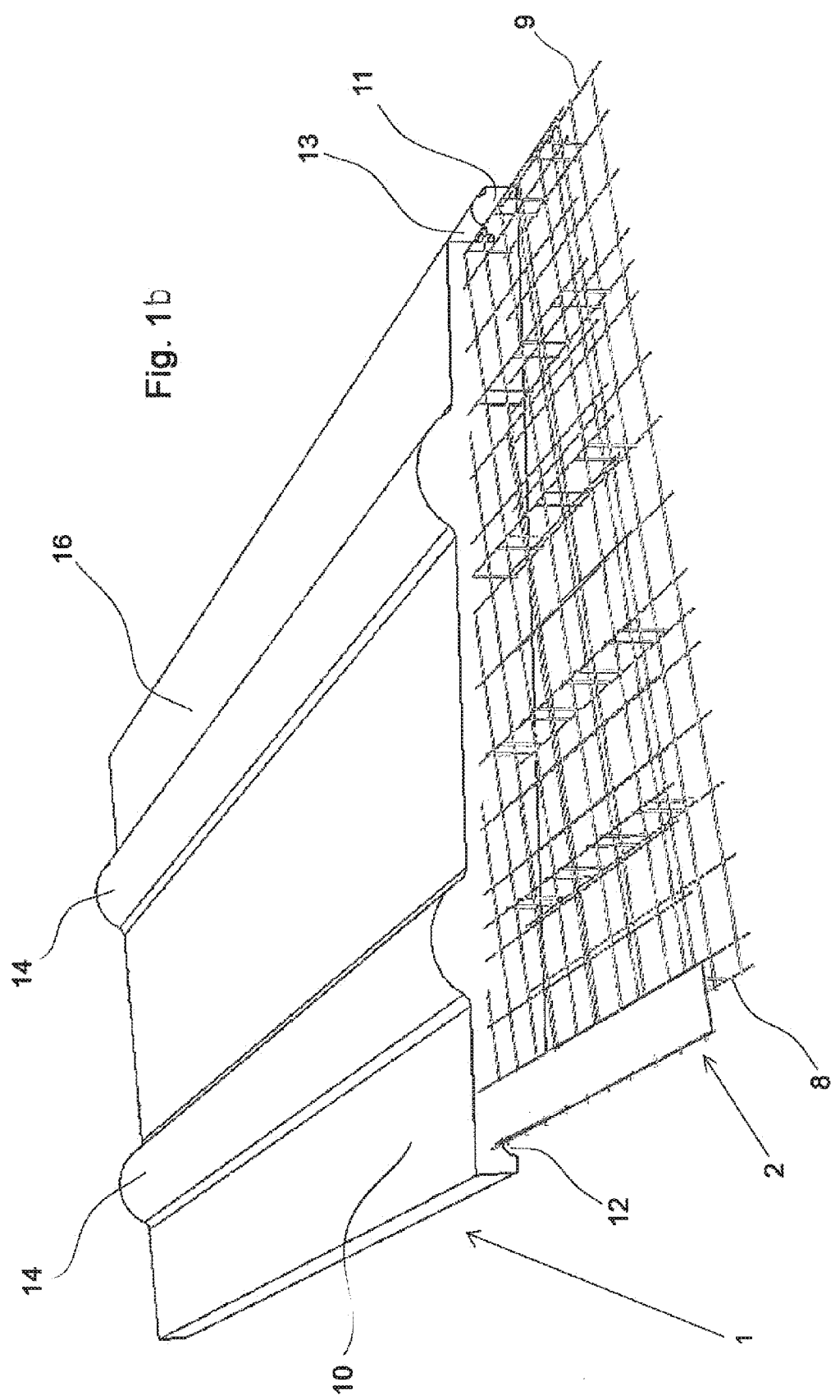

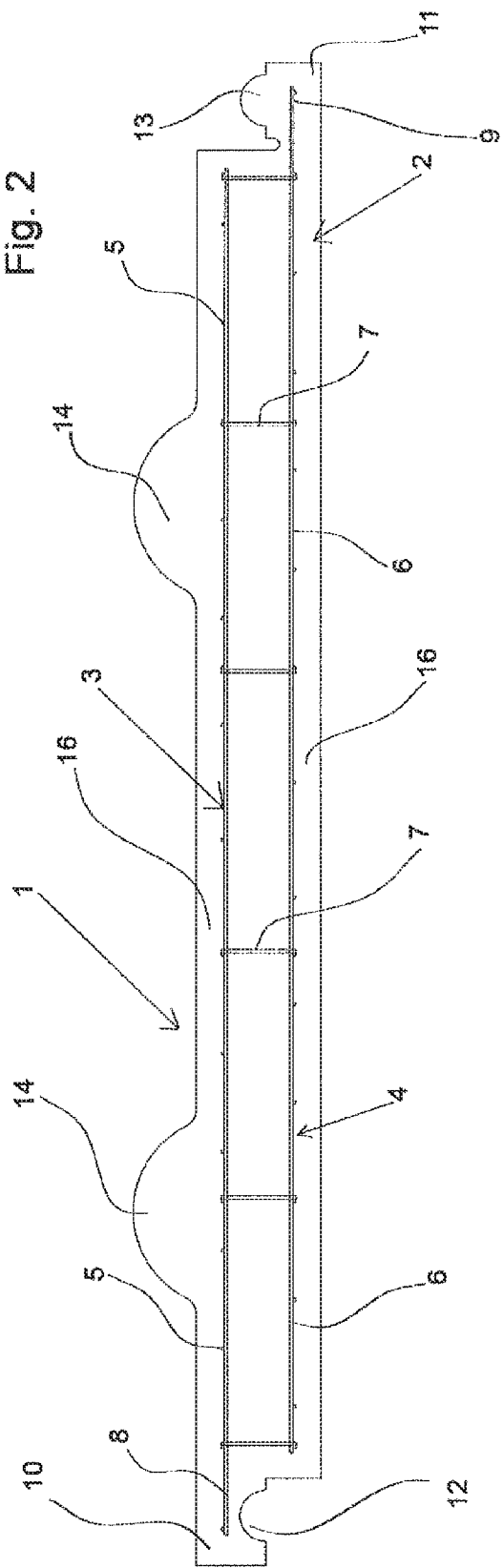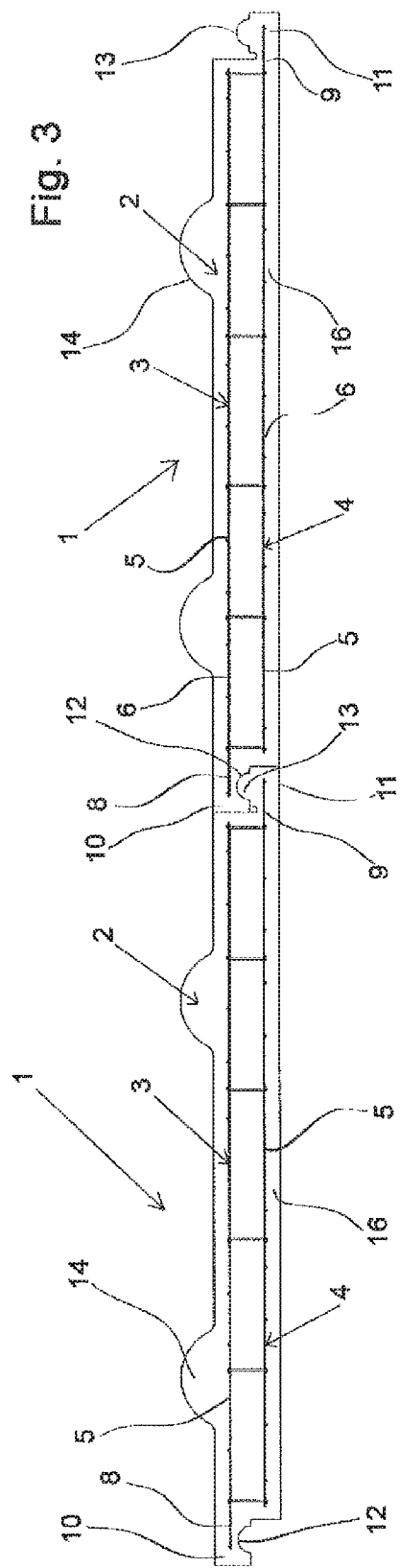

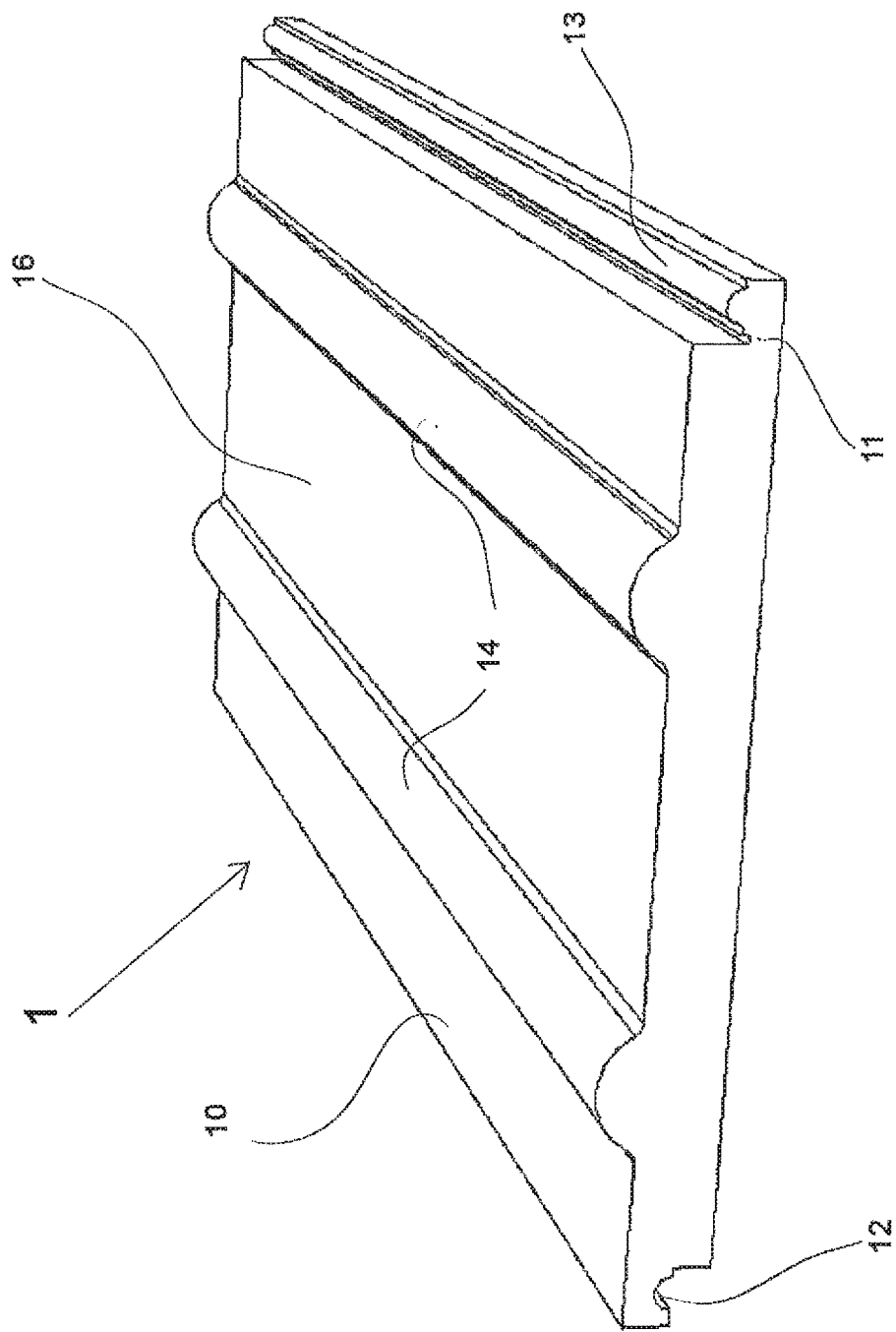

PREFABRICATED BUILDING PRODUCT STRUCTURE MADE OF SINTERED EXPANDED POLYSTYRENE AND METHOD FOR THE RELATIVE PRODUCTION

DETAILED DESCRIPTION

State of the Art

In the building industry, on one side there is known concrete cement, material made up from the aggregation of concrete and steel for a synergic supporting action:

actually, concrete is suitable to support compression stresses but tends to be perforated for values—even very low—of the traction stress.

When a concrete product is subjected to bending, there arises traction and compression forces. The holes made in the extended area tend to propagate rapidly and the product collapses immediately.

In order to subject the concrete products to bending there is provided—in the stretched area—steel, i.e. a material capable of resisting to traction forces. The traction stresses are transferred from the concrete to the steel which traverses the fissures limiting the development thereof.

Even the cutting stresses cause traction and thus in the concrete it is necessary to provide armour capable of absorbing the traction stresses generated by the cutting.

The armour of an inflexed product is thus constituted by "longitudinal" iron elements which absorb the traction stresses bound to the bending and "brackets" or "bent iron elements" which absorb the fraction stresses generated by the cutting.

In the building industry there are known sandwich building panels made of steel wire netting and sintered expanded plastic material, formed by a panel-like core made of sintered expanded plastic material, for example and preferably polystyrene, with differentiated density as a function of the intended building use of the panel, enclosed between two electrowelded steel wire nettings, also mutually joined—by electrowelding—by sections of steel wire to constitute crosspieces perforating said core.

The monolithic product thus made may be positioned modularly onsite and plastered, held by the metal nettings, to constitute prefabricated panels with optimal resistance, anti-seismic, heat insulation, sound-proof and fire-proof characteristics.

Furthermore, a twinned pair of panels thus made may be used, with excellent results, as a formwork so to say "disposable", i.e. as a container for the concrete mixture poured between the two panels, which remain incorporated therewith, enclosed to collaborate in the constitution of the panel, contingently plastered on the outer faces, as illustrated above for the single panel.

A further method of use of the building panels of the sandwich type of steel metal netting and sintered expanded plastic material provides for the insertion of the panels in the conventional formworks for holding the poured concrete to be removed after adherence, to be armoured, lightened, insulating and sound-proofing the resulting walls.

OBJECTS OF THE INVENTION

In such context, the main object of the present invention is that of combining for building purposes the characteristics of the reinforced concrete and those of the panels made of sintered expanded polystyrene associated to metal nettings, for obtaining an innovative product capable of finding extensive and feasible application in the building industry.

Another object of the present invention is to attain the aforementioned object and also provide a preferred embodiment of the product capable of optimising the distinctive characteristics of instantaneous and simple laying on site as well as multipurpose and modularity characteristics.

Still, another object of the present invention is to attain the aforementioned objects through a simple and feasible production method by using devices according to the latest state of the art, through simple adaptation implementation modifications and combination in the production line.

A further object of the present invention is to attain the previous objects through a product and a method that are simple and functional, safe in use and relatively inexpensive considering the results practically obtained therewith.

SUMMARY OF THE SOLUTION CONCEPT

These and other objects are attained with the prefabricated building product structure made of sintered expanded polystyrene (eps), in particular a panel, according to the present invention, comprising composite assembly formed by aggregating steel to the sintered expanded polymeric mass (16), preferably of the high density type, by embedding—therein—rod-like steel elements, preferably pre-assembled forming a cage (2) of electrowelded elements; as well as with the method for the relative production according to the present invention comprising positioning the rod-like steel elements, preferably pre-assembled forming a cage (2) of electrowelded elements, within the mould (15) for the expansion of the polystyrene, pouring in the mould (15) of the incoherent granules or pearls (16) obtained from the polymerisation of the styrene, with grain size and volume appropriate for the attainment of a finished product of the high density type, expansion and sintering or amassing of the incoherent polystyrene through contact with water vapour at a temperature higher than ninety degrees centigrade and ensuing trapping the armour (2) in the monolithic mass (16) thus obtained to obtain a solid geometry, according to the mould (15), of armoured sintered expanded polystyrene.

DESCRIPTION OF THE ATTACHED DRAWINGS

Figure 6:
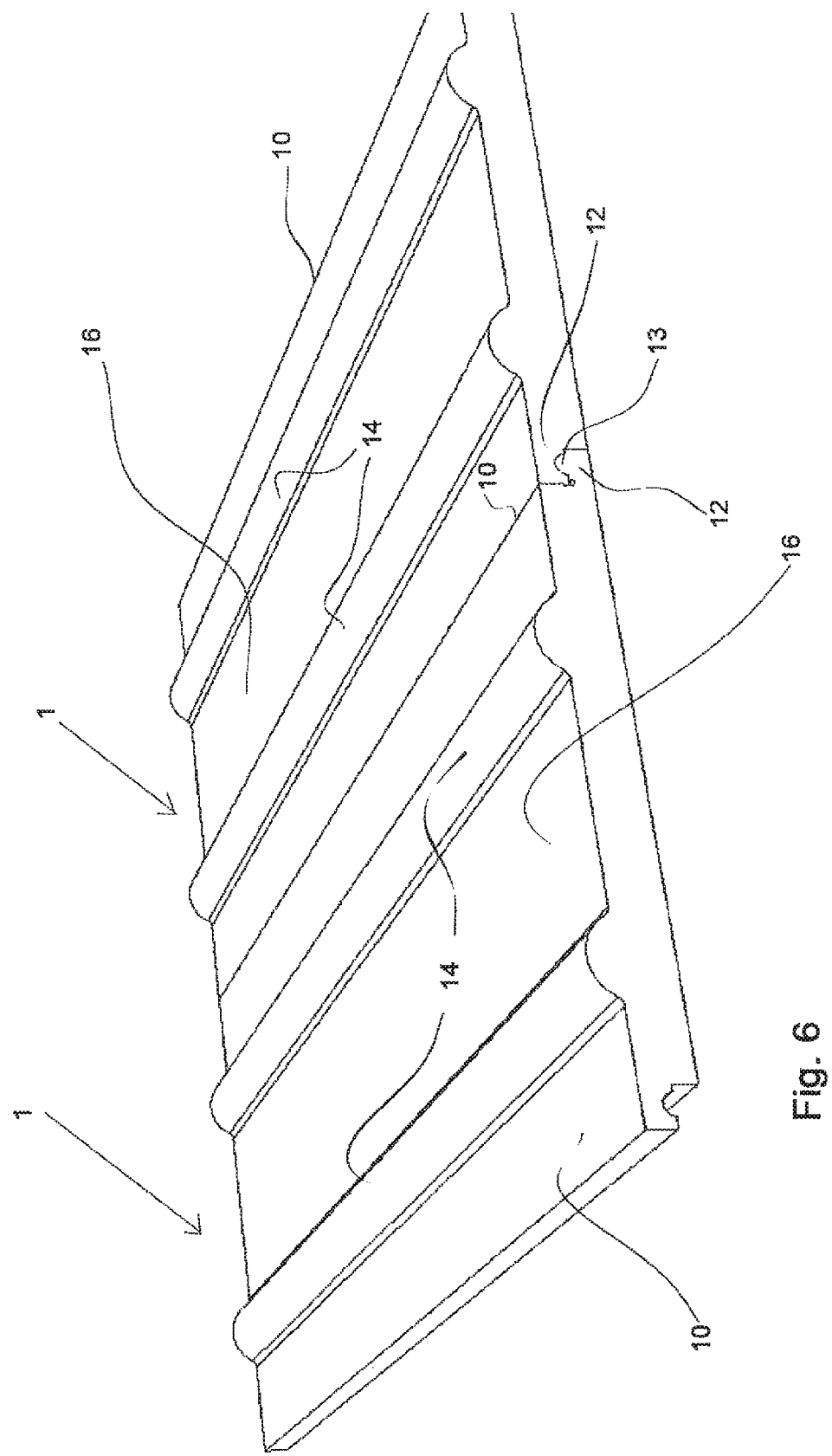
Figure 7:
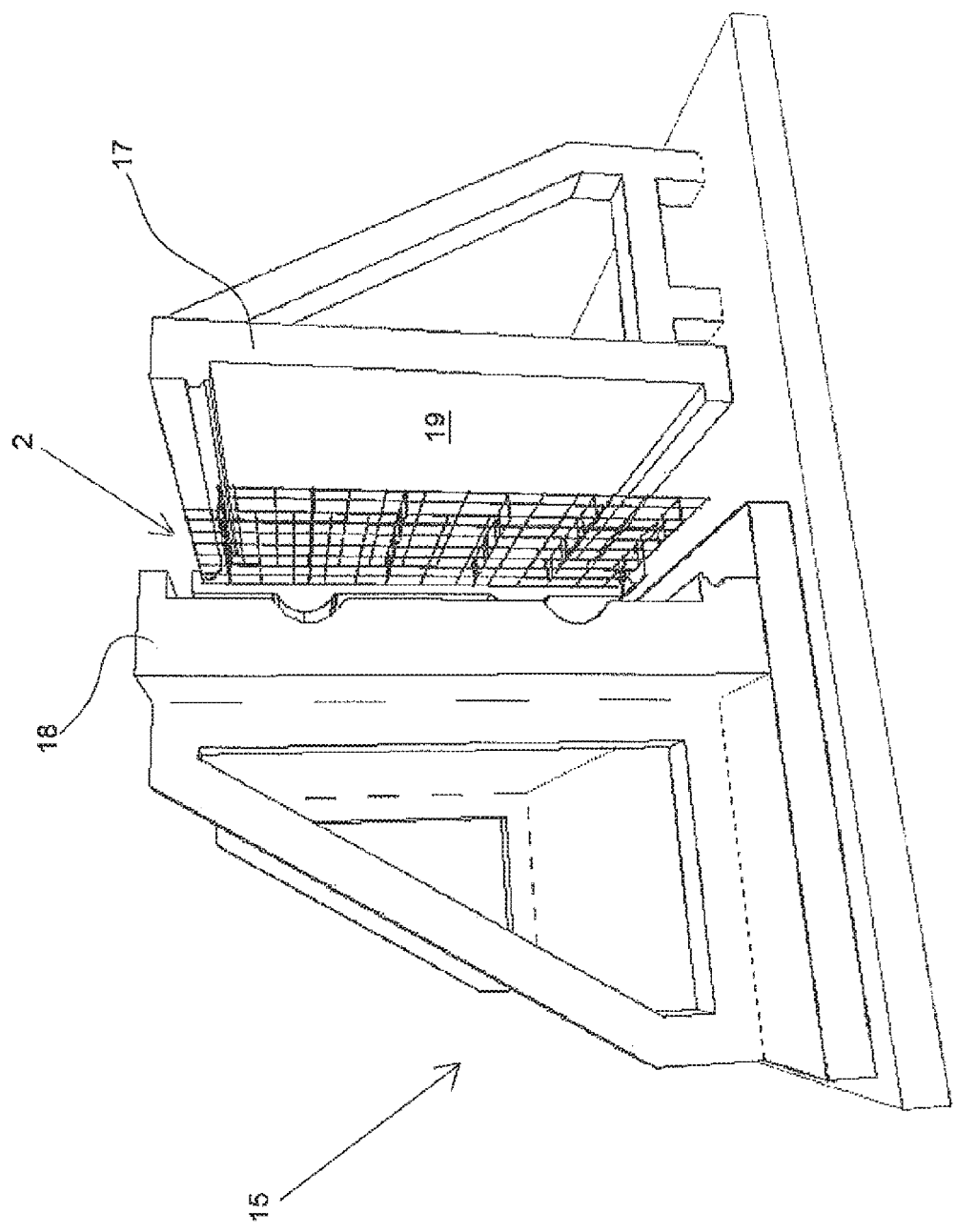
Figure 8:
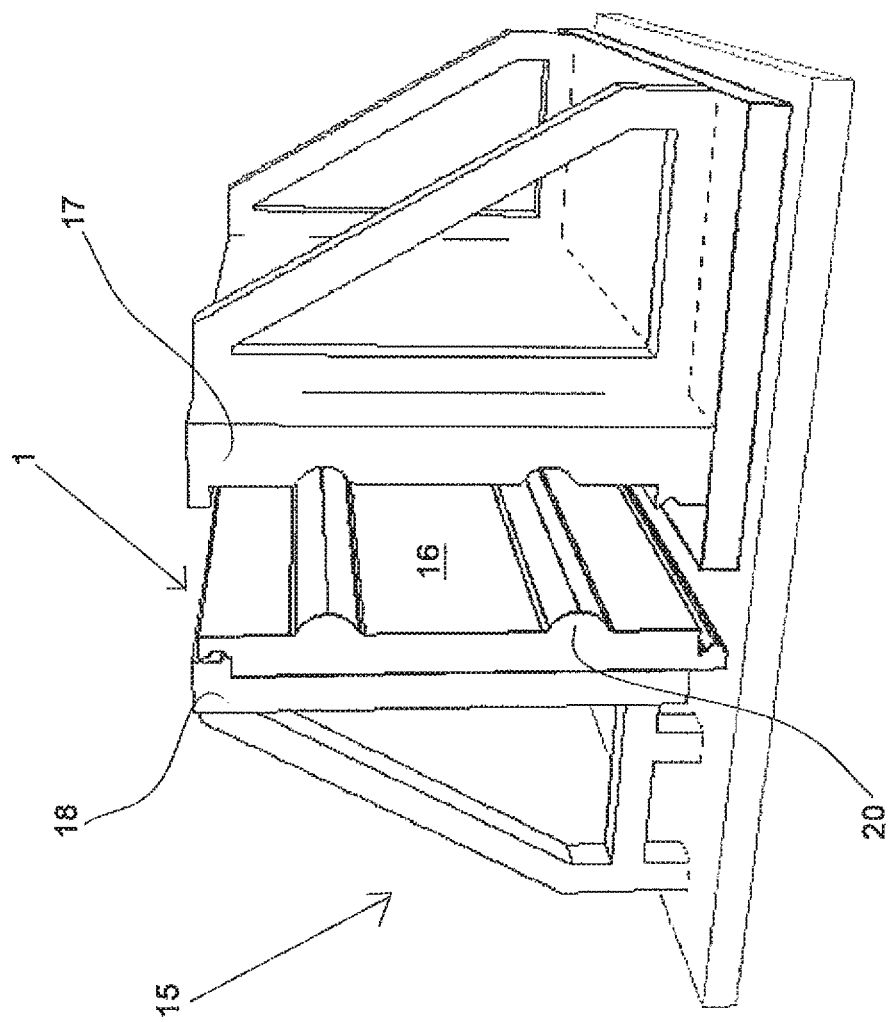

Further characteristics and advantages of the prefabricated building product structure, in particular a panel, made of sintered expanded polystyrene and the method for the relative production according to the present invention, shall be more apparent from the following detailed description of a preferred but non-exclusive embodiment thereof, represented solely by way of non-limiting example in the attached drawings, wherein:

FIGS. 1, 1a, and 1b illustrate perspective views of a composite building panel made of partly sectioned sintered expanded polystyrene according to different embodiments of the present invention;

FIGS. 2 and 3 illustrate transverse sections respectively of one and two composite building panels made of sintered expanded polystyrene as combined;

FIGS. 4 to 6 included illustrate perspective views respectively of one and two composite building panels made of sintered expanded polystyrene as combined;

FIGS. 7 and 8 illustrate schematic perspective views of a mould for the production of composite building panels made of sintered expanded polystyrene in two relative operative steps.

STATIC DESCRIPTION OF THE PREFERRED EMBODIMENT

With reference to such figures in particular to FIG. 1, a composite building panel made of sintered expanded polystyrene 16 according to the present invention, preferably of the high density type, preferably between 30 (thirty) and 50 (fifty) kg/m$^3$ is indicated in its entirety with 1.

In the mass of the composite building panel made of sintered expanded polystyrene 16 there is embedded a cage of steel wires or rods, indicated in its entirety with 2, for example formed by two counterfaced nettings 3 and 4 with square mesh, respectively made up of a plurality of parallel warped wires 5, orthogonally electrowelded to a plurality of parallel weft wires 6.

Such nettings 3 and 4 may for example be obtained through the production lines described and illustrated in the patent documents WO2009/037545A2, WO2011/001341A2, WO2011/158269A2 and WO2012/101559A1 on behalf of the current applicant Angelo Candiracci.

The counterfaced nettings 3 and 4 are mutually joined to form the cage 2 by a plurality of segments or crosspieces 7, respectively electrowelded thereto.

In the preferred embodiment illustrated and described herein, the twinned nettings 3 and 4 are mutually matched laterally staggered forming the cage 2, so that on the sides each residues projecting of a respective longitudinal wing 8 and 9.

The panel 1 in turn literally has some sectioned longitudinal narrow parts 10 and 11, within which there are respectively embedded 1e wings 8 and 9 of the cage 2.

The lateral sections 10 and 11 of the panel 1 are on the two complementarily shaped sides, so that on one side there is provided a longitudinal groove 12 while on the other there longitudinally projects a complementary relief 13.

In the embodiment illustrated and described herein, the mass of the composite building panel made of sintered expanded polystyrene 16 is also shaped on a face with two arc-shaped longitudinal ribs 14, in consideration of the specific functions of the product.

The embodiment of such composite product structure, in particular a panel, is actuated with the method according to the present invention, whose implementation provides for, as illustrated in FIGS. 7 and 8, a mould 15 for expansion and sintering a mass 16 of incoherent polymerised polystyrene beads, poured therein in a known manner according to the amounts and grain size suitable to attain the desired density in the monolithic mass to be obtained, which, preferably, in the composite building product, in particular a panel, made of sintered expanded polystyrene 1 according to the present invention is comprised between 30 (thirty) and 50 (fifty) kg/m$^3$.

The mould 15 is of the two-valve type 17 and 18, of which one mobile against the other to define the expansion and sintering chamber 19;

it can be of the type in which a face of the mould 15 is constituted by the surface of the tail 20 of the polystyrene block 16 produced previously, welding for consubstantiality of the block 16 of new expansion with such tail, advancing the block 16 thus formed up to forming a tail for other block 16 of new expansion, and so on and so forth to produce a continuous block definable for cutting in any contingently desired dimension without generating by-products and waste products, as described and illustrated in the Italian patent no 0001385647 granted on 19 Jan. 2011 upon application no PS2007A000011 filed on 8 Mar. 2007 having the title "Method and device for producing expanded polystyrene blocks" on behalf of the current applicant Angelo Candiracci.

In the mould 15, before pouring the incoherent mass 16 of polymerised polystyrene beads, there is positioned the cage 2 made of steel wires or rods, if necessary placed on the pre-actuated thicknesses, also of the sintered expanded polystyrene, not illustrated, forming a steel cover in the finished product.

Thus, there may follow the closing and sealing of the mould 15 and injection of water vapour, at a temperature higher than ninety degrees centigrade, according to the prior art, to attain the expansion and sintering-amassing of the mass 16 of polymerised polystyrene beads, forming the monolithic mass 16 which incorporates the cage 2, without requiring a steel cover on the other sides with respect to the resting bottom, given that the expansion and sintering process develops pressure substantially homogeneous in the environment of the mould, which does not lead to resting the cage 2 on the walls of the mould 15, or superficial projections of the cage 2 in the finished product.

Simultaneously with the possible pre-actuated thicknesses of the sintered expanded polystyrene on which the cage 2 rests, they are combined by melting to the mass of sintered expanded polystyrene of the panel 1, thus as the tail of the previous block 16 in the mould 15 alternative continuously.

The panel 1 may thus be extracted from the mould 15 for the functions to be specified hereinafter.

DYNAMIC DESCRIPTION OF THE PREFERRED EMBODIMENT

Thus, having completed the static description of a preferred embodiment of the prefabricated building product structure made of sintered expanded polystyrene 16, in particular a panel 1, and of the method for the relative production according to the present invention, following is a dynamic description of the same:

the products or panels 1 have characteristics similar to homologous made of reinforced concrete, given that the sintered expanded polystyrene 16, in the density comprised between 30 (thirty) and 50 (fifty) kg/m$^3$, is suitable to bear compression stresses comparable to those of reinforced concrete, while in terms of traction such synthesis material faces more resistance to perforation, or elasticity, with respect to concrete.

In the products according to the present invention, just like in the reinforced cement, the traction stresses are countered by the complementary synergic supporting action of the grid or steel cage 2, thus obtaining products that can be compared, in terms of structural and mechanical characteristics—to homologous products made of reinforced concrete, but with much lower weight.

Such products, obtained in any shape and size according to the contingent implementation and design needs, may be mutually bound through armours which incorporate, to substantially obtain any building structure.

In the preferred illustrated embodiment, where the panels 1 have the sectioned lateral narrowings 10 and 11, internally armed by the wings 8 and 9 of the cage 2, the panels 1 may be laid on site coplanarly adjacent and mutually constrained by inserting an edge 13 projecting on a lateral narrowing 11 of a panel in the groove 12 obtained in the lateral narrowing 10 of the neighbouring panel 1.

In order to reinforce the constraint, the superimposed lateral complementary narrowings may be mutually rivetted or bolted; in a propedeutic manner to thus further guarantee of fixing, the lateral wings 8 and 9 of the cage 2 embedded therein may be obtained as a sheet or tightly knit netting.

ALTERNATIVE EMBODIMENTS

It is obvious that in further alternative embodiments still falling within the solution concept underlying the embodiment illustrated above and claimed below, the prefabricated building product structure made of sintered expanded polystyrene, in particular a panel, and the method for the relative production according to the present invention may be alternatively implemented through equivalent technical and mechanical elements, by means of devices possibly complemented by further integrative solutions, still falling within the solution concept illustrated above and claimed below.

In particular:

The product or panel may be of any dimension and configuration according to the mould or implementation requirements;

The steel cage, or the inner reinforcement, may vary in terms of dimension, mutually constrained and bound in the respective constituting elements;

any plurality of elements forming the inner reinforcement or associated to the inner reinforcement may be left on the surface or projecting, protruding, on the surface of the product for the joining annexed to other products when laying on site to obtain the buildings.

The sectioned lateral narrowings of the panels, where provided for, may be of any alternative configuration of mutual complementary coupling, same case applying to the inner wings of reinforcement thereof, besides being made of sheet or tightly knit netting to facilitate the mutual fixing of neighbouring structures by means of through elements, as previously mentioned in the dynamic description, may be alternatively constituted and structured in any manner suitable for the purpose.

Advantages of the Invention

As clear from the aforementioned detailed description of a preferred but non-exclusive embodiment, the prefabricated building product structure made of sintered expanded polystyrene, in particular a panel, and the method for the relative production according to the present invention offer advantages corresponding to the attainment of the preset objects alongside other advantages:

as a matter of fact, the solutions described herein incorporate a simple and functional concept solution for obtaining a product suitable for constituting an alternative embodiment with respect to the elements made of reinforced cement, and in any case a building panel with incomparable characteristics of robustness combined with lightness, with immeasurable advantages in terms of reducing weight and simultaneous comparability of the other structural and mechanical characteristics.

KEY TO THE REFERENCE NUMBERS 1) panel in its entirety
2) cage in its entirety
3) first counterfaced netting
4) second counterfaced netting
5) netting warp wires
6) netting weft wires
7) crosspieces
8) first longitudinal wing
9) second longitudinal wing
10) first sectioned longitudinal narrowing
11) second sectioned longitudinal narrowing
12) longitudinal grooving on first sectioned longitudinal narrowing
13) relief projecting on the second sectioned longitudinal narrowing
14) longitudinal ribs
15) mould in its entirety
16) mass of beads
17) first valve of the mould
18) second valve of the mould
19) expansion and sintering chamber
20) surface of tail of the polystyrene block forming a face of the mould

The invention claimed is:

1. A prefabricated building product structure made of sintered expanded polystyrene comprising:
   a composite material assembly having,
   a steel reinforcement structure embedded into a high density sintered polystyrene body,
   wherein the steel reinforcement structure comprises rod-shaped elements embedded inside the sintered polystyrene body, buried under a surface thereof,
   wherein the rod-shaped elements are assembled to form an inner reinforcement cage having twinned nettings joined by crosspieces, and
   wherein said twinned nettings are mutually matched and laterally staggered to form the inner reinforcement cage, so that a longitudinal wing projects from sides of the inner reinforcement cage.

2. The prefabricated building product structure according to claim 1, wherein said rod-shaped elements are pre-assembled to form the inner reinforcement cage through mutual joining by electro-welding.

3. The prefabricated building product structure according to claim 1, wherein said longitudinal wings are configured as sheets or are configured as closely knit nettings.

4. The prefabricated building product structure according to claim 1, wherein said longitudinal wings adapted to being brought into proximity with each other and connected to one another.

5. The prefabricated building product structure according to claim 1, wherein any plurality of elements forming the cage protrude from the surface of the polystyrene body, for joining annexed to other building product structures when laying on site.

6. The prefabricated building product structure according to claim 1, wherein said building product structure is shaped as a panel having a plurality of sectioned longitudinal parts, within which said wings of said cage are embedded.

7. The prefabricated building product structure according to claim 6, wherein said longitudinal parts of said panel are provided on two complementarily shaped sides, so that on one side there is provided a longitudinal groove while on another there is a longitudinally complementary relief.

8. The prefabricated building product structure according to claim 6, wherein said longitudinal parts of said panel are provided on two complementarily shaped sides so that coplanarly neighboring panels are constrained mutually by mating two complementarily shaped sides of the neighboring panels.

\* \* \* \* \*